US012443652B2

(12) United States Patent
Lam et al.

(10) Patent No.: US 12,443,652 B2
(45) Date of Patent: Oct. 14, 2025

(54) METHOD, SYSTEM AND APPARATUS FOR DETECTING PRODUCT FACINGS

(71) Applicant: ZEBRA TECHNOLOGIES CORPORATION, Lincolnshire, IL (US)

(72) Inventors: Joseph Lam, North York (CA); Yuanhao Yu, Mississauga (CA); Abhishek Rawat, Toronto (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 1200 days.

(21) Appl. No.: 16/429,820

(22) Filed: Jun. 3, 2019

(65) Prior Publication Data
US 2020/0380454 A1  Dec. 3, 2020

(51) Int. Cl.
| | |
|---|---|
| *G06F 16/583* | (2019.01) |
| *G01S 17/89* | (2020.01) |
| *G06Q 10/087* | (2023.01) |
| *G06T 7/11* | (2017.01) |
| *G06T 7/13* | (2017.01) |
| *G06T 7/136* | (2017.01) |
| *G06V 10/24* | (2022.01) |
| *G06V 10/44* | (2022.01) |

(Continued)

(52) U.S. Cl.
CPC ....... *G06F 16/5854* (2019.01); *G06Q 10/087* (2013.01); *G06T 7/11* (2017.01); *G06T 7/13* (2017.01); *G06T 7/136* (2017.01); *G06V 10/24* (2022.01); *G06V 10/44* (2022.01); *G06V 20/10* (2022.01); *G06V 20/647* (2022.01); *G01S 17/89* (2013.01); *G06T 2207/10028* (2013.01)

(58) Field of Classification Search
CPC ........... G06Q 10/087; G06T 7/11; G06T 7/13; G06T 7/136; G06T 2207/10028; G01S 17/89; G01S 17/87; G06V 10/24; G06V 10/44; G06V 20/10; G06V 20/647; G06F 16/5854
See application file for complete search history.

(56) References Cited

U.S. PATENT DOCUMENTS 10,306,203 B1 *  5/2019  Goyal ..................... G06T 7/194
10,489,677 B2 *  11/2019  Rzeszutek ............ G06V 10/751
(Continued)

FOREIGN PATENT DOCUMENTS

WO    WO-2018204308 A1 *  11/2018  ............. G06F 15/76

*Primary Examiner* — Michael Jared Walker

(57) ABSTRACT

A method of detecting product facings from captured depth and image data includes: obtaining, at an imaging controller, (i) depth measurements representing a support structure supporting a plurality of product facings, (ii) image data representing the support structure, and (iii) a set of region of interest (ROI) indicators each indicating a position of a plurality of the product facings; generating a first set of candidate facing edges from the depth measurements; generating a second set of candidate facing edges from the image data; generating a third set of candidate facing edges by combining the first and second sets; generating, for each adjacent pair of the third set of candidate facing edges, a candidate facing boundary; selecting a subset of output facing boundaries from the candidate facing boundaries, based on the ROI indicators; and storing the output facing boundaries in a memory coupled to the imaging controller.

19 Claims, 10 Drawing Sheets

(51) Int. Cl.
*G06V 20/10* (2022.01)
*G06V 20/64* (2022.01)

(56) References Cited

U.S. PATENT DOCUMENTS

| | | | | |
|---|---|---|---|---|
| 10,521,914 | B2* | 12/2019 | Lam | G06T 7/12 |
| 10,572,763 | B2* | 2/2020 | Rzeszutek | G06V 10/25 |
| 10,731,970 | B2* | 8/2020 | Cao | G06T 7/12 |
| 10,740,911 | B2* | 8/2020 | Phan | G06T 5/005 |
| 2008/0012955 | A1* | 1/2008 | Johnson | G06T 7/136 |
| | | | | 348/222.1 |
| 2015/0310601 | A1* | 10/2015 | Rodriguez | G07G 1/0072 |
| | | | | 348/150 |
| 2015/0363758 | A1* | 12/2015 | Wu | G06V 30/414 |
| | | | | 705/20 |
| 2016/0150213 | A1* | 5/2016 | Mutti | G06V 30/142 |
| | | | | 348/143 |
| 2017/0032311 | A1* | 2/2017 | Rizzolo | G06V 20/10 |
| 2017/0178060 | A1* | 6/2017 | Schwartz | G06V 10/44 |
| 2017/0178227 | A1* | 6/2017 | Graham | G06Q 30/0643 |
| 2017/0323436 | A1* | 11/2017 | Foland | G06T 15/205 |
| 2017/0337508 | A1* | 11/2017 | Bogolea | G06K 9/6201 |
| 2018/0107999 | A1* | 4/2018 | Rizzolo | G06Q 10/087 |
| 2018/0108120 | A1* | 4/2018 | Venable | G06T 3/4038 |
| 2019/0065848 | A1* | 2/2019 | Borrel | G06K 9/6289 |
| 2019/0066316 | A1* | 2/2019 | Bardagjy | G02B 27/425 |
| 2019/0096091 | A1* | 3/2019 | Bao | G06T 7/11 |

\* cited by examiner

METHOD, SYSTEM AND APPARATUS FOR DETECTING PRODUCT FACINGS

BACKGROUND

Environments in which objects are managed, such as retail facilities, warehousing and distribution facilities, and the like, may store such objects in regions such as aisles of shelf modules or the like. For example, a retail facility may include objects such as products for purchase, and a distribution facility may include objects such as parcels or pallets. A mobile automation apparatus may be deployed within such facilities to perform tasks at various locations. For example, a mobile automation apparatus may be deployed to capture data representing an aisle and corresponding products in a retail facility. However, the variability of the products in the facility, as well as variations in data capture conditions (e.g. lighting and the like) can prevent the accurate detection of individual products and their status from such data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
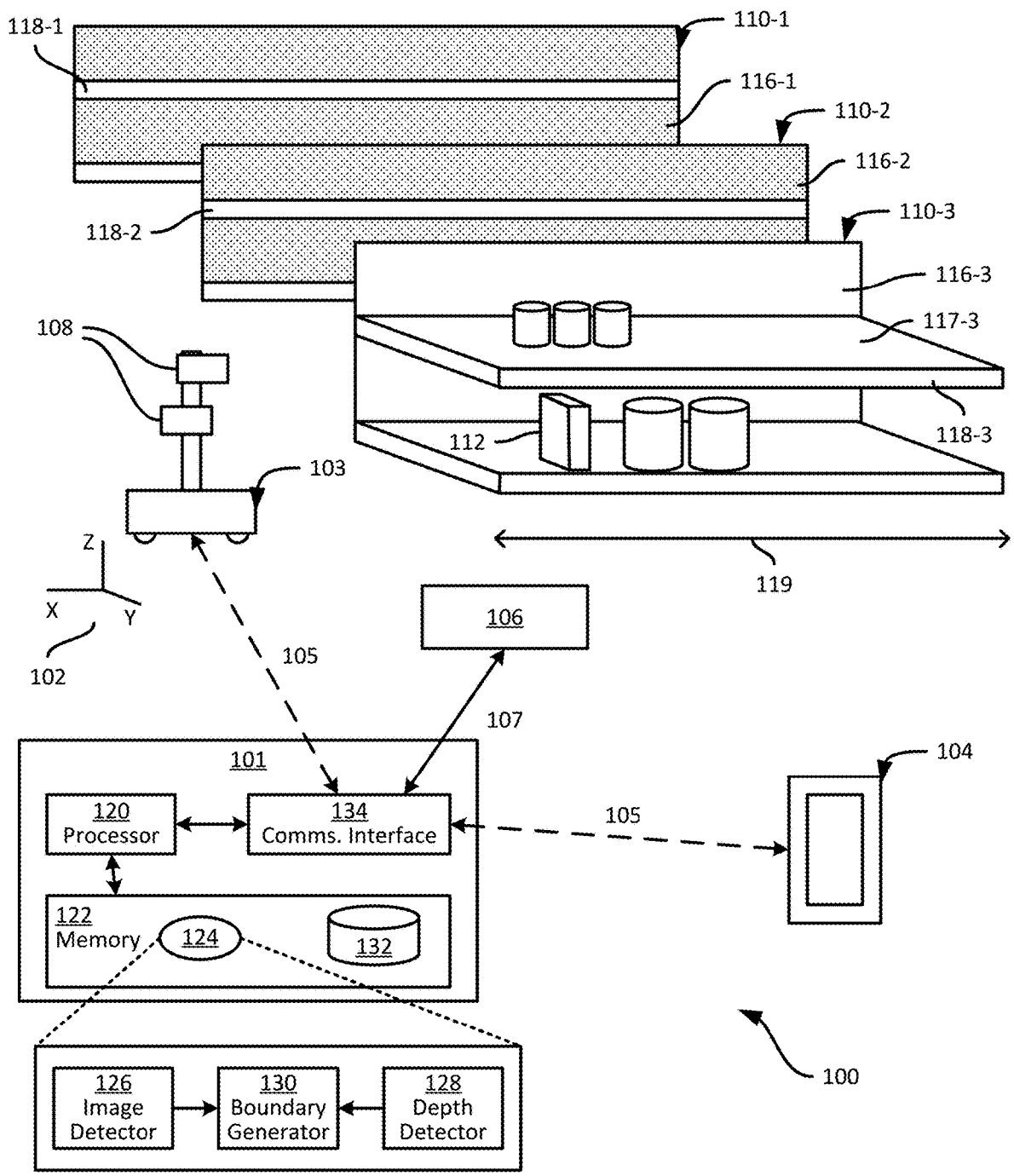
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method by an imaging controller of detecting product facings from captured depth and image data, the method comprising: obtaining at the imaging controller: (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a plurality of the product facings; generating, by a depth detector of the imaging controller, from the depth measurements, a first set of candidate facing edges; generating, by an image detector of the imaging controller, from the image data, a second set of candidate facing edges from the image data; generating by a boundary generator of the imaging controller: a third set of candidate facing edges by combining the first and second sets, and a candidate facing boundary for each adjacent pair of candidate facing edges in the third set of candidate facing edges; selecting, by the boundary generator of the imaging controller, a subset of output facing boundaries from the candidate facing boundaries, based on the ROI indicators; presenting, by the boundary generator of the imaging controller, product facing detection output including the selected subset of output facing boundaries.

Additional examples disclosed herein are directed to a computing device, comprising: a memory storing: (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a plurality of the product facings; an imaging controller having: a depth detector configured to: obtain the depth measurements and the ROI indicators; and generate, from the depth measurements, a first set of candidate facing edges; an image detector configured to: obtain the image data and the ROI indicators; and generate, from the image data, a second set of candidate facing edges; and a boundary generator configured to generate: a third set of candidate facing edges by combining the first and second sets; a candidate facing boundary for each adjacent pair of candidate facing edges in the third set of candidate facing edges; select a subset of output facing boundaries from the candidate facing boundaries, based on the ROI indicators; and present product facing detection output including the selected subset of output facing boundaries.

Further examples disclosed herein are directed to a non-transitory computer-readable medium storing instructions executable by an imaging controller to configure the imaging controller to: obtain (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a plurality of the product facings; generate, at a depth detector of the imaging controller, from the depth measurements, a first set of candidate facing edges; generate, at an image detector of the imaging controller, from the image data, a second set of candidate facing edges; generate, at a boundary generator of the imaging controller, a third set of candidate facing edges by combining the first and second sets; generate, at the boundary generator of the imaging controller, for each adjacent pair of candidate facing edges in the third set of candidate facing edges, a candidate facing boundary; select, at the boundary generator of the imaging controller, a subset of output facing boundaries from the candidate facing boundaries, based on the ROI indicators; and present, by the boundary generator of the imaging controller, product facing detection output including the selected subset of output facing boundaries.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one client computing device 104 via communication links 105, illustrated in the present example as including wireless links. In the present example, the links 105 are provided by a wireless local area network (WLAN) deployed via one or more access points (not shown). In other examples, the server 101, the client device 104, or both, are located remotely (i.e. outside the environment in which the apparatus 103 is deployed), and the links 105 therefore include wide-area networks such as the Internet, mobile networks, and the like. The system 100 also includes a dock 106 for the apparatus 103 in the present example. The dock 106 is in communication with the server 101 via a link 107 that in the present example is a wired link. In other examples, however, the link 107 is a wireless link.

The client computing device 104 is illustrated in FIG. 1 as a mobile computing device, such as a tablet, smart phone or the like. In other examples, the client device 104 is implemented as another type of computing device, such as a desktop computer, a laptop computer, another server, a kiosk, a monitor, and the like. The system 100 can include a plurality of client devices 104 in communication with the server 101 via respective links 105.

The system 100 is deployed, in the illustrated example, in a retail facility including a plurality of support structures such as shelf modules 110-1, 110-2, 110-3 and so on (collectively referred to as shelf modules 110 or shelves 110, and generically referred to as a shelf module 110 or shelf 110—this nomenclature is also employed for other elements discussed herein). Each shelf module 110 supports a plurality of products 112. Each shelf module 110 includes a shelf back 116-1, 116-2, 116-3 and a support surface (e.g. support surface 117-3 as illustrated in FIG. 1) extending from the shelf back 116 to a shelf edge 118-1, 118-2, 118-3.

The shelf modules 110 (also referred to as sub-regions of the facility) are typically arranged in a plurality of aisles (also referred to as regions of the facility), each of which includes a plurality of modules 110 aligned end-to-end. In such arrangements, the shelf edges 118 face into the aisles, through which customers in the retail facility, as well as the apparatus 103, may travel. As will be apparent from FIG. 1, the term "shelf edge" 118 as employed herein, which may also be referred to as the edge of a support surface (e.g., the support surfaces 117) refers to a surface bounded by adjacent surfaces having different angles of inclination. In the example illustrated in FIG. 1, the shelf edge 118-3 is at an angle of about ninety degrees relative to the support surface 117-3 and to the underside (not shown) of the support surface 117-3. In other examples, the angles between the shelf edge 118-3 and the adjacent surfaces, such as the support surface 117-3, is more or less than ninety degrees.

The apparatus 103 is equipped with a plurality of navigation and data capture sensors 108, such as image sensors (e.g. one or more digital cameras) and depth sensors (e.g. one or more Light Detection and Ranging (LIDAR) sensors, one or more depth cameras employing structured light patterns, such as infrared light, or the like). The apparatus 103 is deployed within the retail facility and, via communication with the server 101 and use of the sensors 108, navigates autonomously or partially autonomously along a length 119 of at least a portion of the shelves 110.

While navigating among the shelves 110, the apparatus 103 can capture images, depth measurements and the like, representing the shelves 110 (generally referred to as shelf data or captured data). Navigation may be performed according to a frame of reference 102 established within the retail facility. The apparatus 103 therefore tracks its pose (i.e. location and orientation) in the frame of reference 102.

The server 101 includes a special purpose controller, such as a processor 120, specifically designed to control and/or assist the mobile automation apparatus 103 to navigate the environment and to capture data. The processor 120 is also specifically designed, as will be discussed in detail herein, to process image data and depth measurements captured by the apparatus 103 representing the shelf modules 110, in order to detect product facings on the shelf modules 110. As will be apparent to those skilled in the art, a product facing is a single instance of a product facing into the aisle. Thus, if a support surface 117 carries three identical products adjacent to one another, the products represent three distinct facings. The resulting detected product facings can be provided to product status detection mechanisms (which may also be implemented by the processor 120 itself).

The processor 120 is interconnected with a non-transitory computer readable storage medium, such as a memory 122. The memory 122 includes a combination of volatile memory (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In some embodiments, the processor 120 is implemented as one or more central processing units (CPUs) and/or graphics processing units (GPUs).

The memory 122 stores computer readable instructions for performing various functionality, including control of the apparatus 103 to navigate the modules 110 and capture shelf data, as well as post-processing of the shelf data. The execution of the above-mentioned instructions by the processor 120 configures the server 101 to perform various actions discussed herein. The applications stored in the memory 122 include an artifact detection application 124 (also simply referred to as the application 124). In general, via execution of the application 124 or subcomponents thereof and in conjunction with other components of the server 101, the processor 120 performs various actions to detect, in image data and depth measurements representing the shelves 110 (e.g. data captured by the apparatus 103), individual product facings, for use in downstream processing to detect product status information (e.g. whether products are out of stock, misplaced or the like).

Certain example components of the application 124 are shown in FIG. 1, including an image detector 126 and a depth detector 128. The image and depth detectors 126 and 128 detect product edges in images and depth measurements, respectively, such as those captured by the apparatus 103. The application 124 also includes a boundary generator 130 that receives detected edges from the detectors 126 and 128, and generates product facing boundaries from the edges. In other embodiments, the application 124 may be implemented as a suite of logically distinct application, each implementing a suitable portion of the functionality discussed below. For example, the detectors 126 and 128, as well as the boundary generator 130, may be implemented as separate applications.

The memory 122 can also store data for use in the above-mentioned control of the apparatus 103, such as a repository 132 containing a map of the retail environment and any other suitable data (e.g. operational constraints for use in controlling the apparatus 103, data captured by the apparatus 103, and the like).

The processor 120, as configured via the execution of the control application 128, is also referred to herein as an imaging controller 120, or simply as a controller 120. As will now be apparent, some or all of the functionality implemented by the imaging controller 120 described below may also be performed by preconfigured special purpose hardware controllers (e.g. one or more logic circuit arrangements specifically configured to optimize the speed of image processing, for example via FPGAs and/or Application-Specific Integrated Circuits (ASICs) configured for this purpose) rather than by execution of the application 124 by the processor 120.

The server 101 also includes a communications interface 134 interconnected with the processor 120. The communications interface 134 includes suitable hardware (e.g. transmitters, receivers, network interface controllers and the like) allowing the server 101 to communicate with other computing devices—particularly the apparatus 103, the client device 104 and the dock 106—via the links 105 and 107. The links 105 and 107 may be direct links, or links that traverse one or more networks, including both local and wide-area networks. The specific components of the communications interface 134 are selected based on the type of network or other links that the server 101 is required to communicate over. In the present example, as noted earlier, a wireless local-area network is implemented within the retail facility via the deployment of one or more wireless access points. The links 105 therefore include either or both wireless links between the apparatus 103 and the mobile device 104 and the above-mentioned access points, and a wired link (e.g. an Ethernet-based link) between the server 101 and the access point.

The processor 120 can therefore obtain data captured by the apparatus 103 via the communications interface 134 for storage (e.g. in the repository 132) and subsequent processing (e.g. to detect product facings, as noted above). The server 101 may also transmit status notifications (e.g. notifications indicating that products are out-of-stock, in low stock or misplaced) to the client device 104 responsive to the determination of product status data. The client device 104 includes one or more controllers (e.g. central processing units (CPUs) and/or field-programmable gate arrays (FPGAs) and the like) configured to process (e.g. to display) notifications received from the server 101.

Figure 2:
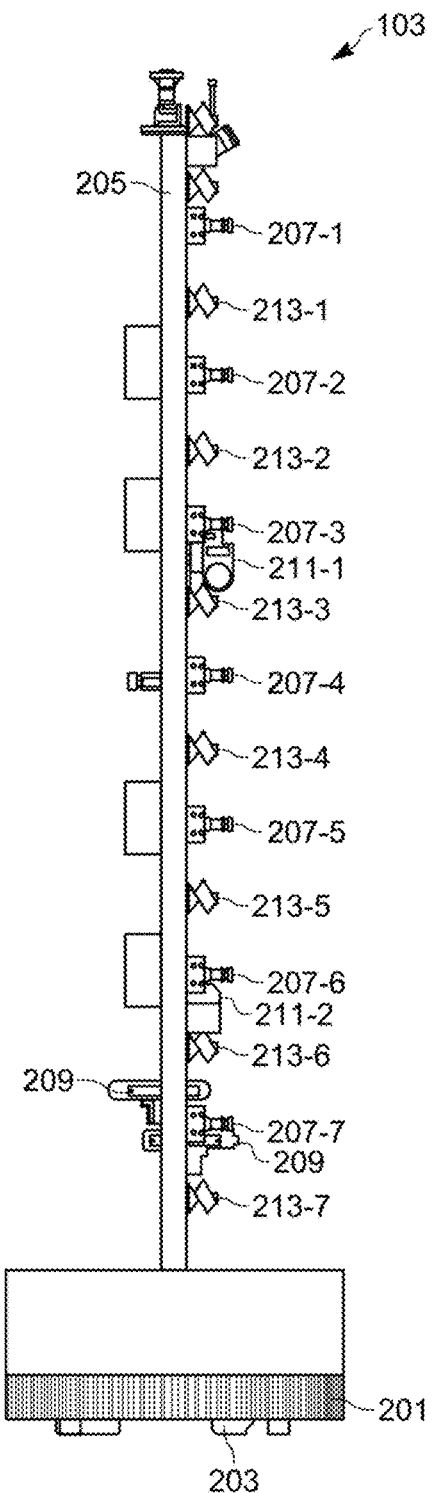
FIG. 2 depicts a mobile automation apparatus in the system of FIG. 1.

Turning now to FIG. 2, the mobile automation apparatus 103 is shown in greater detail. The apparatus 103 includes a chassis 201 containing a locomotive assembly 203 (e.g. one or more electrical motors driving wheels, tracks or the like). The apparatus 103 further includes a sensor mast 205 supported on the chassis 201 and, in the present example, extending upwards (e.g., substantially vertically) from the chassis 201. The mast 205 supports the sensors 108 mentioned earlier. In particular, the sensors 108 include at least one imaging sensor 207, such as a digital camera. In the present example, the mast 205 supports seven digital cameras 207-1 through 207-7 oriented to face the shelves 110.

The mast 205 also supports at least one depth sensor 209, such as a 3D digital camera capable of capturing both depth data and image data. The apparatus 103 also includes additional depth sensors, such as LIDAR sensors 211. In the present example, the mast 205 supports two LIDAR sensors 211-1 and 211-2. In other examples, the mast 205 can support additional LIDAR sensors 211 (e.g. four LIDARs 211). As shown in FIG. 2, the cameras 207 and the LIDAR sensors 211 are arranged on one side of the mast 205, while the depth sensor 209 is arranged on a front of the mast 205. That is, the depth sensor 209 is forward-facing (i.e. captures data in the direction of travel of the apparatus 103), while the cameras 207 and LIDAR sensors 211 are side-facing (i.e. capture data alongside the apparatus 103, in a direction perpendicular to the direction of travel). In other examples, the apparatus 103 includes additional sensors, such as one or more RFID readers, temperature sensors, and the like.

The mast 205 also supports a plurality of illumination assemblies 213, configured to illuminate the fields of view of the respective cameras 207. That is, the illumination assembly 213-1 illuminates the field of view of the camera 207-1, and so on. The cameras 207 and LIDARs 211 are oriented on the mast 205 such that the fields of view of the sensors each face a shelf 110 along the length 119 of which the apparatus 103 is traveling. As noted earlier, the apparatus 103 is configured to track a pose of the apparatus 103 (e.g. a location and orientation of the center of the chassis 201) in the frame of reference 102, permitting data captured by the apparatus 103 to be registered to the frame of reference 102 for subsequent processing.

Figure 3:
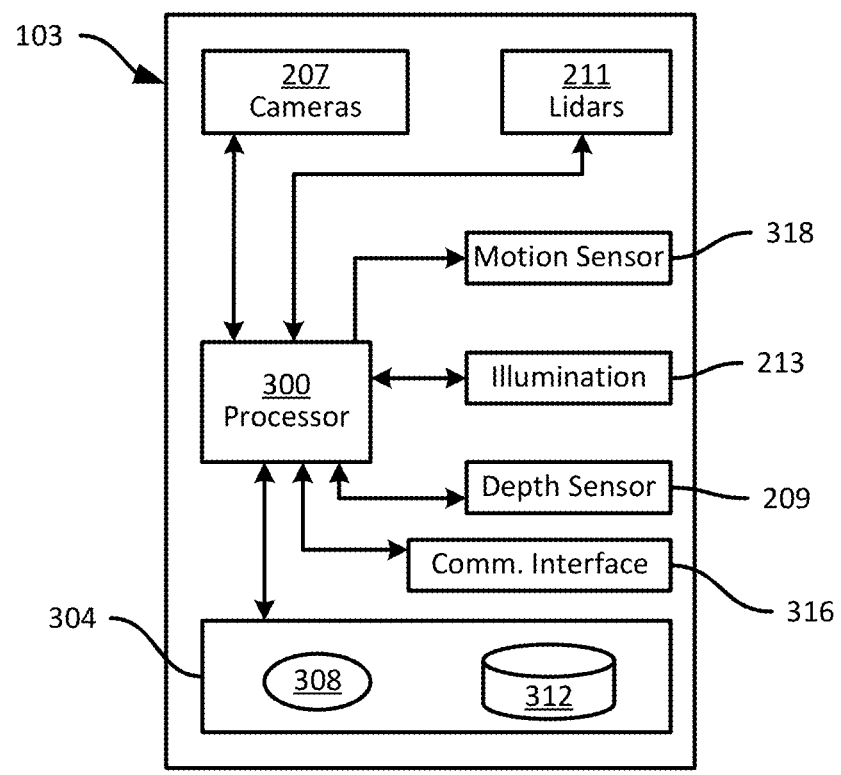
FIG. 3 is a block diagram of certain internal components of the mobile automation apparatus in the system of FIG. 1.

Referring to FIG. 3, certain components of the mobile automation apparatus 103 are shown, in addition to the cameras 207, depth sensor 209, LIDARs 211, and illumination assemblies 213 mentioned above. The apparatus 103 includes a special-purpose controller, such as a processor 300, interconnected with a non-transitory computer readable storage medium, such as a memory 304. The memory 304 includes a suitable combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits. The memory 304 stores computer readable instructions for execution by the processor 300. In particular, the memory 304 stores an apparatus control application 308 which, when executed by the processor 300, configures the processor 300 to perform various functions related to navigating the facility and controlling the sensors 108 to capture data, e.g. responsive to instructions from the server 101. Those skilled in the art will appreciate that the functionality implemented by the processor 300 via the execution of the application 308 may also be implemented by one or more specially designed hardware and firmware components, such as FPGAs, ASICs and the like in other embodiments.

The memory 304 may also store a repository 312 containing, for example, a map of the environment in which the apparatus 103 operates, for use during the execution of the application 308. The apparatus 103 also includes a communications interface 316 enabling the apparatus 103 to communicate with the server 101 (e.g. via the link 105 or via the dock 106 and the link 107), for example to receive instructions to navigate to specified locations and initiate data capture operations.

In addition to the sensors mentioned earlier, the apparatus 103 includes a motion sensor 318, such as one or more wheel odometers coupled to the locomotive assembly 203. The motion sensor 318 can also include, in addition to or instead of the above-mentioned wheel odometer(s), an inertial measurement unit (IMU) configured to measure acceleration along a plurality of axes.

Figure 4:
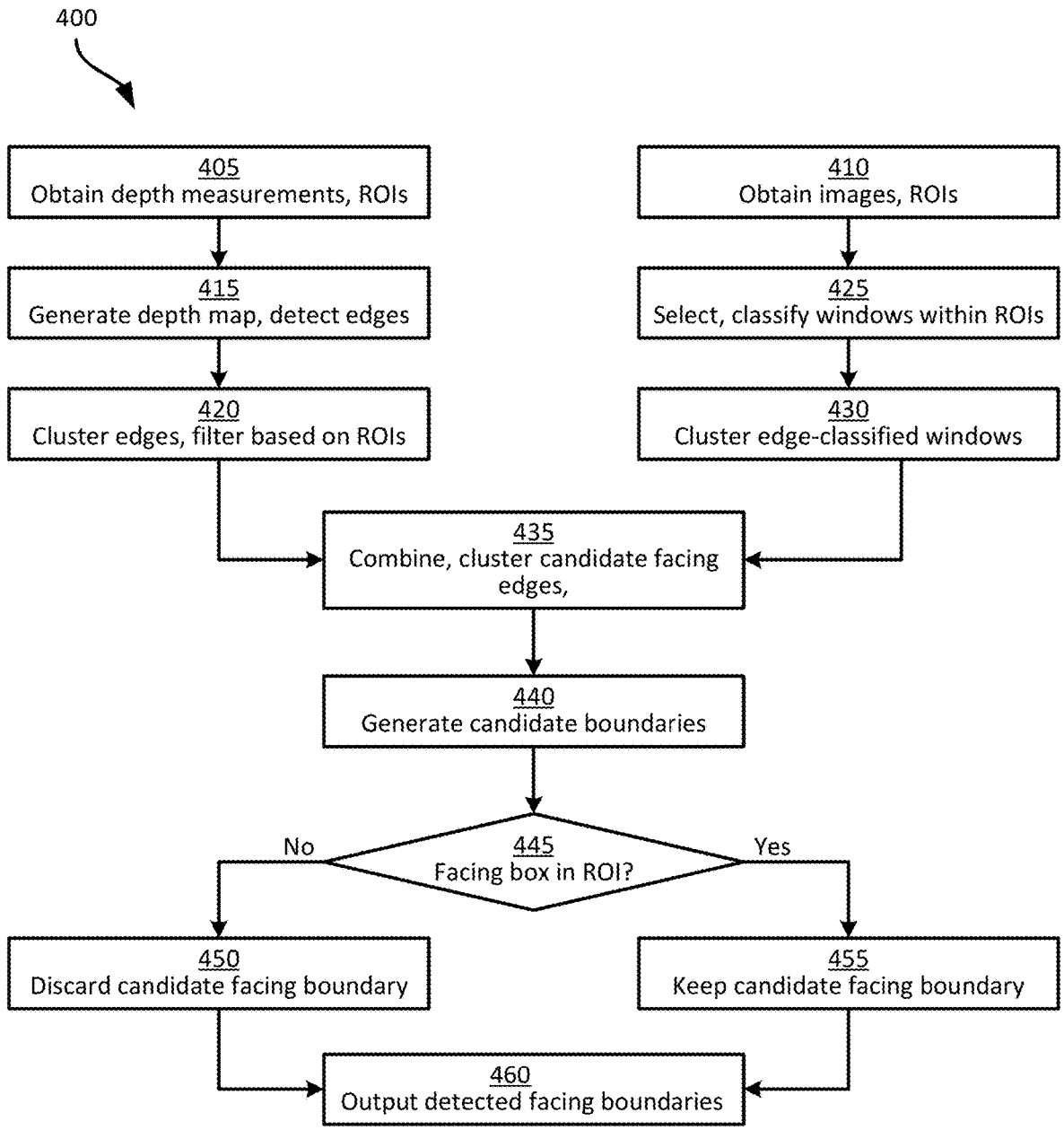
FIG. 4 is a flowchart of a method of detecting product facings in the system of FIG. 1.

The actions performed by the server 101, and specifically by the processor 120 as configured via execution of the application 124, to detect product facings from captured data representing the shelves 110 (e.g. images and depth measurements captured by the apparatus 103) will now be discussed in greater detail with reference to FIG. 4. FIG. 4 illustrates a method 400 of detecting product facings. The method 400 will be described in conjunction with its performance in the system 100, and in particular by the server 101, with reference to the components illustrated in FIG. 1. As will be apparent in the discussion below, in other examples, some or all of the processing described below as being performed by the server 101 may alternatively be performed by the apparatus 103.

The actions taken by the server 101 during the performance of the method 400 implement three stages of processing. The first and second stage may be performed in any order relative to each other (including simultaneously). In the first stage, the server 101 (and specifically, the depth detector 128) detects candidate product facing edges from depth measurements, such as those captured by the depth camera 209 or the LIDARs 211. In the second stage, the server 101 (and specifically, the image detector 126) detects candidate product facing edges from image data, such as images captured by the cameras 207. In the third stage, which follows completion of the first and second stages, the server 101 (and specifically the boundary generator 130) generates product facing boundaries by combining and processing the candidate edge facings from the first and second stages.

At block 405, corresponding to the first stage mentioned above, the server 101 obtains a plurality of depth measurements (which may also be referred to as a point cloud), for example by retrieving the depth measurements from the memory 122. The depth measurements may have been previously captured by the apparatus 103 and provided to the server 101, e.g. via the links 105 and/or 107. The depth measurements are assumed, in the present example, to be defined by coordinates in the frame of reference 102. In other examples, however, the depth measurements may be obtained in the format in which they were captured, prior to registration to the common frame of reference 102. Further, as noted above, the apparatus 103 includes multiple depth sensors (e.g. the two LIDARs 211 shown in FIG. 2). The process described below may be repeated independently for each set of depth measurements corresponding to a given depth sensor, and the results may be registered to the frame of reference 102 at a later point.

The server 101 also retrieves, at block 405, a set of region of interest (ROI) indicators each indicating a position of a plurality of the product facings. The ROI indicators may also be referred to as product blobs, as the server 101 may generate the ROI indicators by performing a suitable blob detection operation on images of the shelf modules 110. The ROI indicators are typically bounding boxes defined in the frame of reference 102.

At block 410, corresponding to the second stage mentioned above, the server 101 obtains image data in the form of one or more images of the shelf modules 110, e.g. captured by the apparatus 103. As with the depth measurements mentioned above, the images need not be registered to the frame of reference 102 at this point, but in the discussion below the images are assumed to be registered to the frame of reference 102 for clarity. The server 101 also retrieves the above-mentioned ROI indicators at block 410, as the ROI indicators are employed in both the first and second stages of the method 400.

Figure 5:
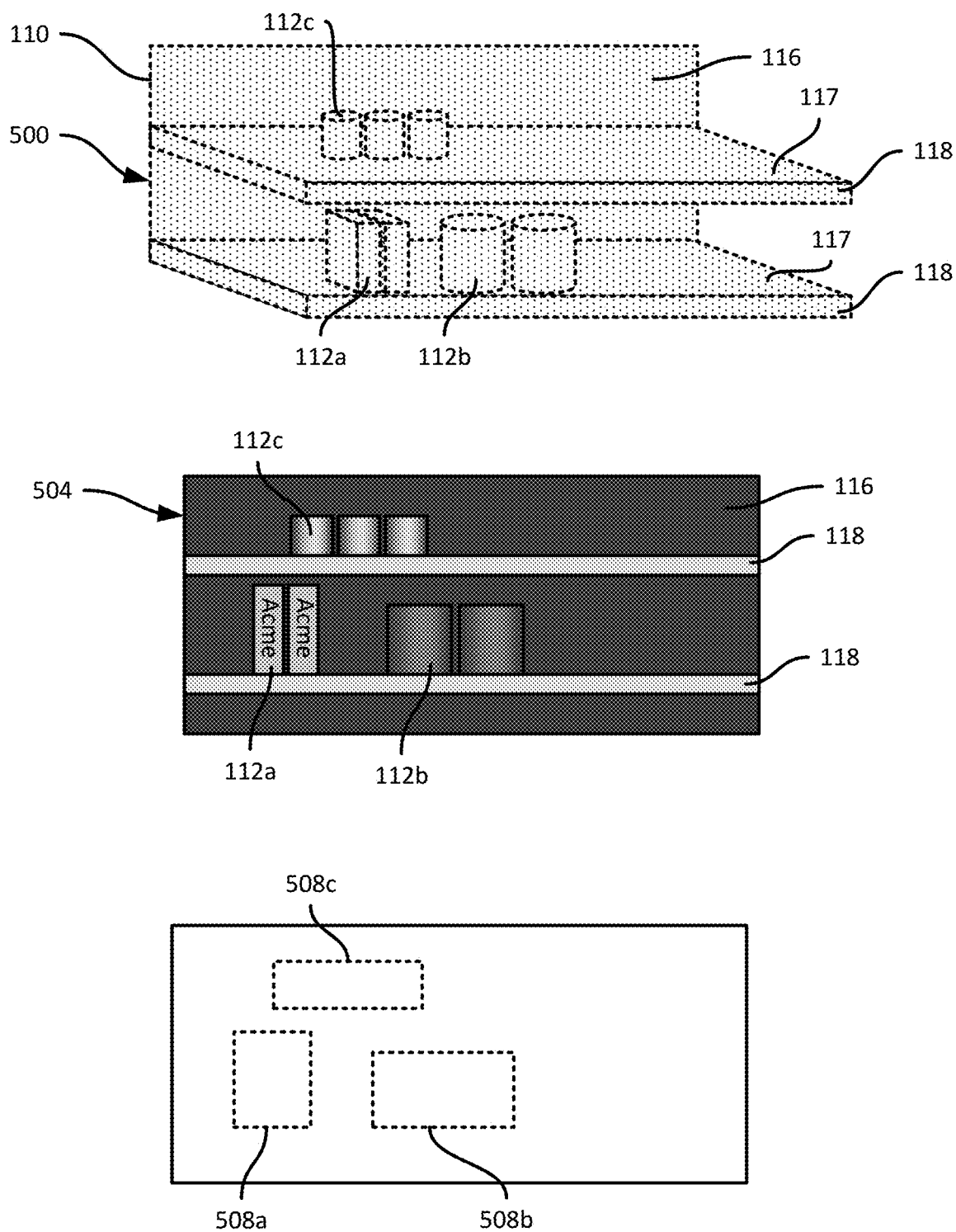
FIG. 5 is a diagram illustrating input data to the method of FIG. 4.

Turning to FIG. 5, examples of the input data obtained by the server 101 at blocks 405 and 410 are illustrated. In particular, FIG. 5 illustrates a point cloud 500 containing a plurality of depth measurements representing a shelf module 110 supporting various products 112. In particular, the point cloud 500 depicts two facings of a first product 112a, two facings of a second product 112b, and three facings of a third product 112c.

FIG. 5 also illustrates an image 504 of the shelf module 110 depicted by the point cloud 500. The image may be, for example, an RGB image captured by the apparatus 103 substantially simultaneously with the capture of the point cloud 500. The image 504 also depicts (albeit in two dimensions, rather than three dimensions) the shelf edges 118, shelf back 116, and products 112a, 112b and 112c as the point cloud 500. Finally, FIG. 5 illustrates a set of ROI indicators 508a, 508b and 508c indicating positions of product blobs detected, e.g. by the server 101 or another computing device. Detection of the ROI indicators can be performed based on any suitable combination of depth measurements and images, including the point cloud 500 and the image 504. The ROI indicators are illustrated in two dimensions, but can also be defined in three dimensions, according to the frame of reference 102. As is evident from FIG. 5, the ROI indicators 508 correspond to the respective positions of the products 112a, 112b and 112c, but do not distinguish between the individual product facings shown in the point cloud 500 and the image 504. The spaces between products on the shelves 110 may often be small enough that detecting individual product facings, in the absence of the processing techniques described below, is inaccurate or overly computationally expensive.

Returning to FIG. 4, the first stage of the method 400 (depth-based detection of candidate facing edges, as performed by the depth detector 128) will be described prior to a discussion of the second stage (image-based detection of candidate facing edges, as performed by the image detector 126). It will be understood, however, that the order of the first and second stages can readily be changed, and that the first and second stages can also be performed simultaneously.

Figure 6:
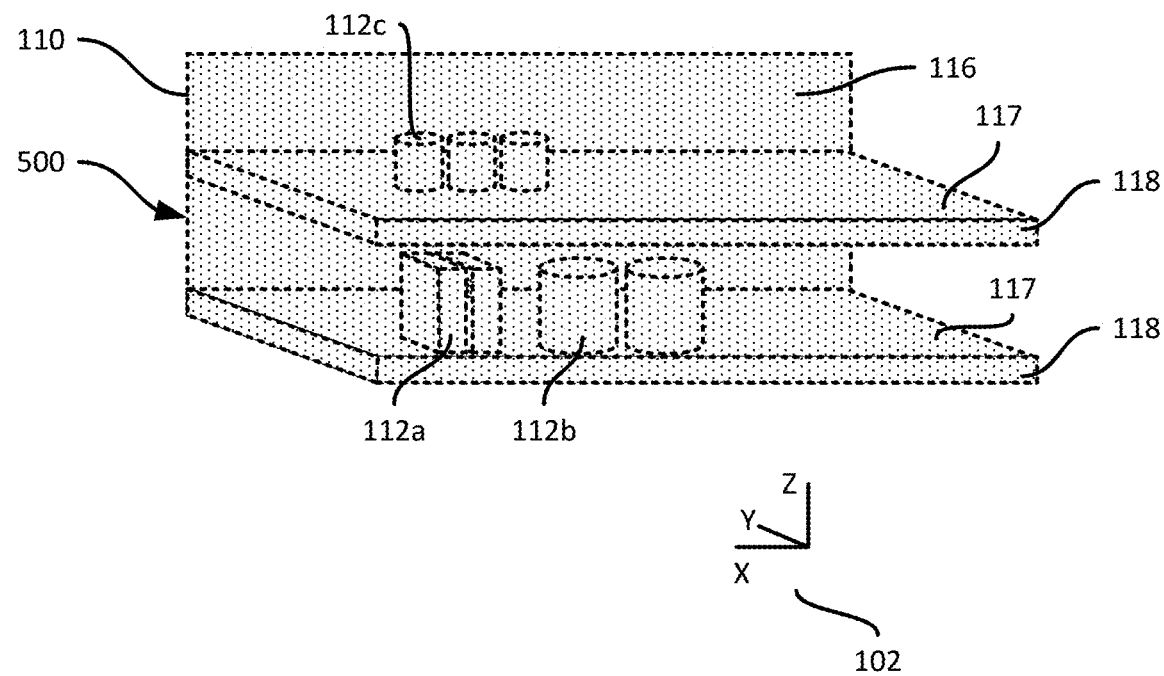
FIG. 6 is a diagram illustrating a depth map generated at block 415 of the method of FIG. 4.
Figure 6:
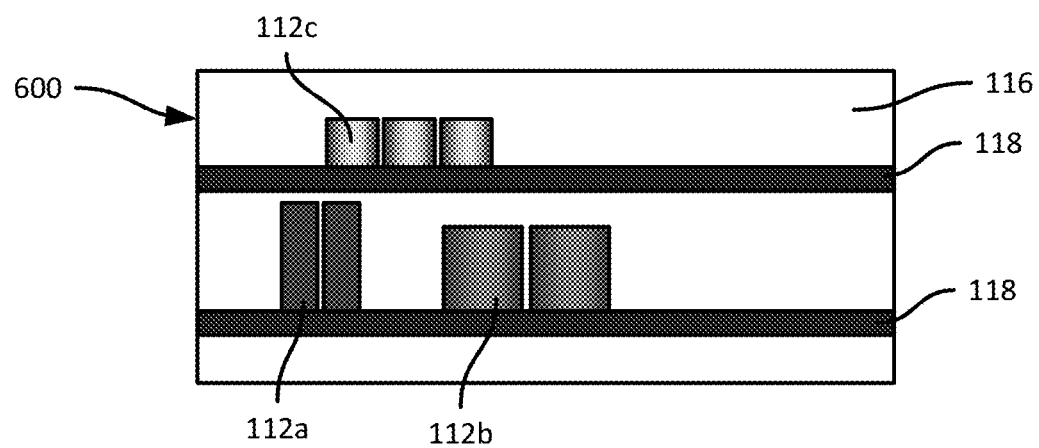

At block 415, the server 101 generates a depth map from the point cloud 500 obtained at block 405. The depth map is a two-dimensional representation of the point cloud 500, in which each depth measurement facing the aisle (i.e. not occluded from the aisle by another depth measurement) in the point cloud 500 is assigned an intensity based on its depth (i.e. its dimension along the Y axis of the frame of reference 102). FIG. 6 illustrates the point cloud 500 along with the frame of reference 102, as well as a two-dimensional depth map 600 generated from the point cloud 500 at block 415. Intensity values are assigned to the depth map 600 such that points having lower depths (i.e. being closer to the aisle and further from the shelf back 116) are darker, while points having greater depths are lighter. Other intensity scales may also be employed than the one illustrated in FIG. 6 (e.g. points at greater depths may be lighter, while points at smaller depths may be darker).

At block 415, the server 101 also detects edges in the depth map 600. Edge detection at block 415 may be performed by applying any suitable edge detection operation, or combination of edge detection operations, to the depth map 600. In the present example, the server 101 performs edge detection at block 415 by applying a Sobel operator to the depth map 600, followed by a Hough transform. As will be apparent to those skilled in the art, the Sobel transform emphasizes areas of the depth map 600 that have strong gradients (and are therefore likely to represent edges). In complex environments such as those encountered in a retail environment, the results of the Sobel operator may be noisy. The Hough transform is therefore applied to detect continuous lines from the potentially noisy edges emphasized by the Sobel operator. The Hough transform, in the present embodiment, is configured to detect only vertical lines (or lines having orientations that are within a predefined threshold of vertical, such as 5 degrees), because the edges of product facings are assumed to be vertical.

Figure 7:
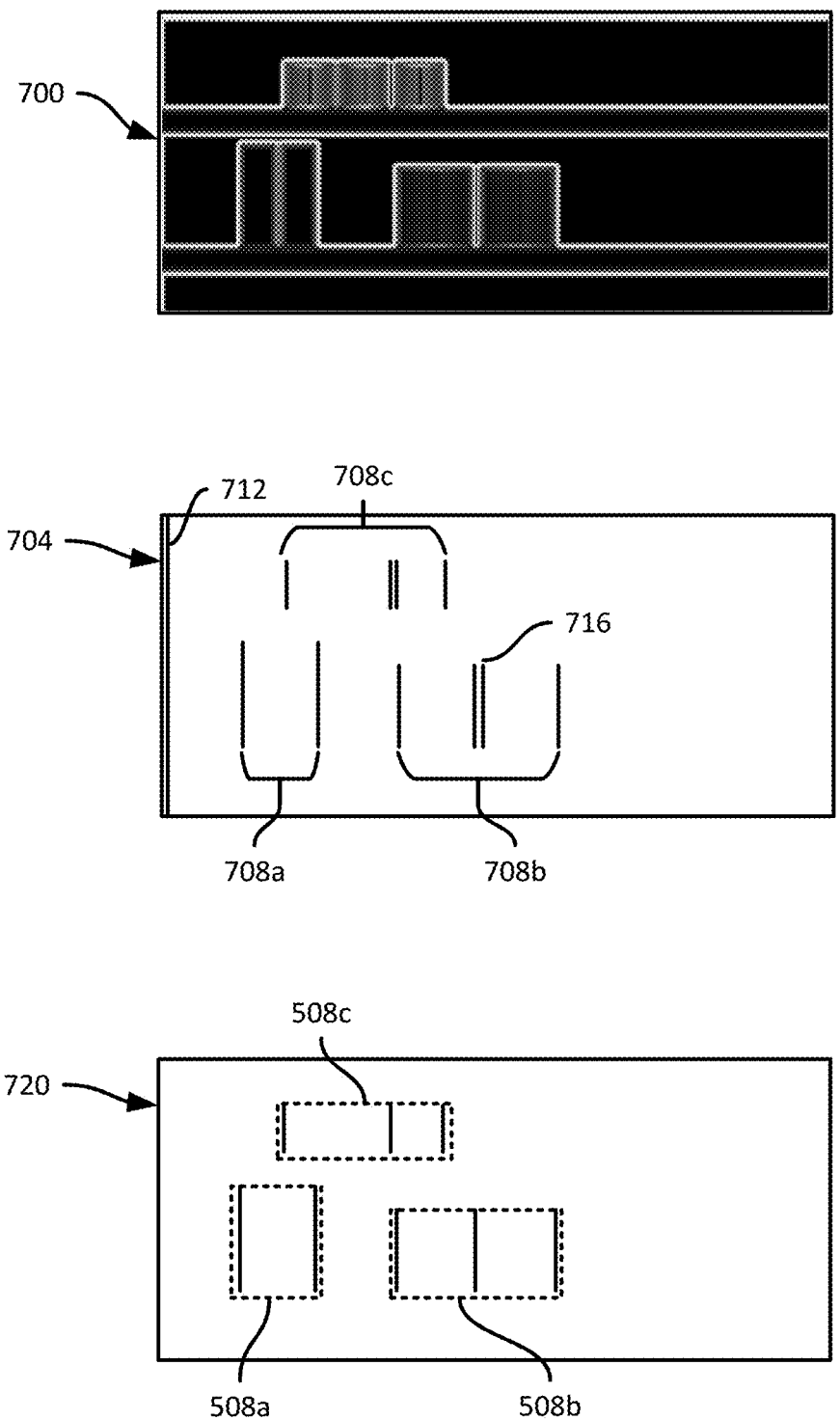
FIG. 7 is a diagram illustrating detection of candidate facing edges at block 415 of the method of FIG. 4.

FIG. 7 illustrates an example performance of edge detection at block 415 via the application of a Sobel operator and a Hough transform to the depth map 600. In particular, the output of the Sobel operator is shown in a processed depth map 700 (which may also be referred to as an edge-weighted depth map). As is apparent from the processed depth map 700, certain edges of the products 112 are emphasized with high intensities (i.e. are lighter), while areas of the depth map 600 that do not correspond to edges have low intensities (i.e. are darker).

FIG. 7 also illustrates a set 704 of candidate facing edges derived from the processed depth map 700 via application of a Hough transform or any other suitable line detection operation. In particular, the set 704 includes candidate facing edges 708a corresponding to the products 112a, candidate facing edges 708b corresponding to the products 112b, and candidate facing edges 708c corresponding to the products 112c. However, as shown in FIG. 7, the candidate facing edges 708a and 708b are incomplete. Specifically, the inner edges of the products (where each product 112 is closely spaced relative to another product 112) were not detected. Further, the set 704 includes an edge 712 that does not represent any products 112. The edge 712 may be an artifact, correspond to a side of the shelf module 110, or the like. Additionally, the candidate facing edges 708b and 708c include separate detections of certain adjacent edges, such as the pair of edges 716.

Returning to FIG. 4, at block 420 the server 101 clusters the candidate edges detected at block 415, and filters the candidate edges based on the ROI indicators 508. For example, the server 101 may determine, for each pair of candidate edges, whether the distance between the edges is below a configurable threshold. When the determination is affirmative, the server 101 converts the pair of edges into a single edge, e.g. with a position generated from the average of the pair. Thus, referring again to FIG. 7, a final set 720 of candidate edges is shown in which the duplicate edge detections, including the pair 716, have been clustered into single edges.

In addition, the ROI indicators 508 are overlaid on the set 720 of candidate edges. At block 420, the server 101 evaluates whether any of the set 704 of candidate edges do not fall within an ROI indicator 508. Any edges that do not fall within an ROI indicator 508 are discarded, as the ROI indicators 508 indicate the presence of products 112, and any edges outside the ROI indicators 508 are therefore not product-related edges. The edge 712 has therefore been removed from the set 720.

Following the completion of block 420, the depth detector 128 passes the final set 720 of candidate facing edges from the first stage to the boundary generator 130 for further processing. Before discussing the boundary generator 130 in further detail, however, the second stage of the method 400 will be discussed below.

Returning to FIG. 4, the second stage begins at block 410, described earlier. Having obtained the image 504 and the ROI indicators 508 at block 410, at block 425 the server 101 is configured to select a plurality of classification windows from the image 504, based on the ROI indicators 508. The server 101 then classifies each of the selected windows as either containing a product edge or not containing a product edge.

Figure 8:
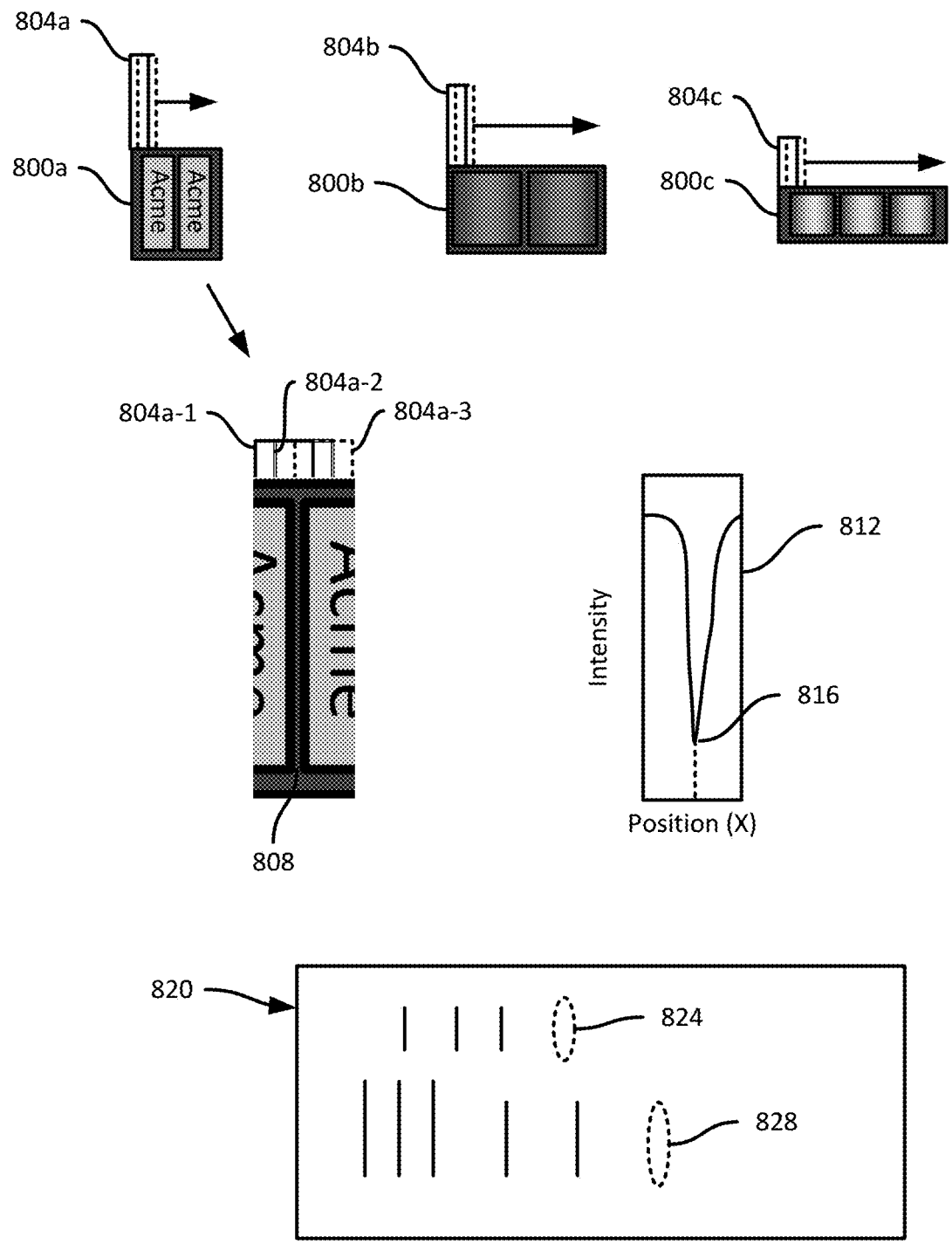
FIG. 8 is a diagram illustrating detection of candidate facing edges at blocks 425 and 430 of the method of FIG. 4.

Turning to FIG. 8, the window selection and classification process at block 425 is illustrated. In particular, the server 101 first selects regions 800a, 800b and 800c of the image 504 within the ROI indicators 508. In other words, regions of the image 504 outside the ROI indicators 508 are not processed at block 425. Having selection the regions 800, the server 101 divides each region 800 into a plurality of windows 804a, 804b, 804c. Each window has a height equal to the height of the corresponding region 800, and a width equal to a configurable window width (e.g. stored in the memory 122). The windows 804 overlap, as shown in FIG. 8, such that each portion of a given region 800 appears in multiple windows.

Each window 804 is classified as containing or not containing a product facing edge by providing the window 804 to a classifier, such as a previously trained convolutional neural network (CNN) or any other suitable classifier. As will be apparent, the classifier is previously trained based on a training set of images, e.g. with labelled positive and negative examples of windows containing (or not containing) product facing edges. The classifier returns, for each window, a binary indication of whether or not the window contains a product facing edge.

As will now be apparent, the overlap in the windows 804 results in each product facing edge being detected in multiple windows. For example, FIG. 8 illustrates three windows 804a-1, 804a-2 and 804a-3 that each contain the edge 808 between products 112a. At block 430, the server 101 therefore clusters groups of overlapping windows 804 that were classified as containing edges, on the assumption that a group of overlapping windows 804 classified as containing edges likely all contain the same edge.

Specifically, as shown in FIG. 8, the server 101 selects a single position for the edge 808, for example, by generating an intensity profile 812 corresponding to the portion of the image 504 within the combined area of the windows 804a-1, 804a-2 and 804a-3, The server 101 then selects, as the position for the edge, the position of the minimum intensity 816 in the intensity profile 812 (i.e. the darkest point in the intensity profile). The process above is repeated for each of the regions 800, and the server 101 thereby generates a final set 820 of candidate facing edges. As seen in FIG. 8, the set 820 includes the edges that were not successfully detected via the depth-based stage discussed earlier, but does not include edges corresponding to the right-most sides of the products 112b and 112c, which should appear in the areas 824 and 828.

Following the completion of block 430, the image detector 126 passes the final set 820 of candidate facing edges from the first stage to the boundary generator 130 for further processing. Referring again to FIG. 4, at block 435 the boundary generator 130 combines the final sets 720 and 820 of candidate facing edges from the detectors 126 and 128 (that is, from the first and second stages of the method 400 set out above). The boundary generator 130 also clusters candidate facing edges, for example by collapsing any pairs of edges within a threshold distance of one another into a single edge.

Figure 9:
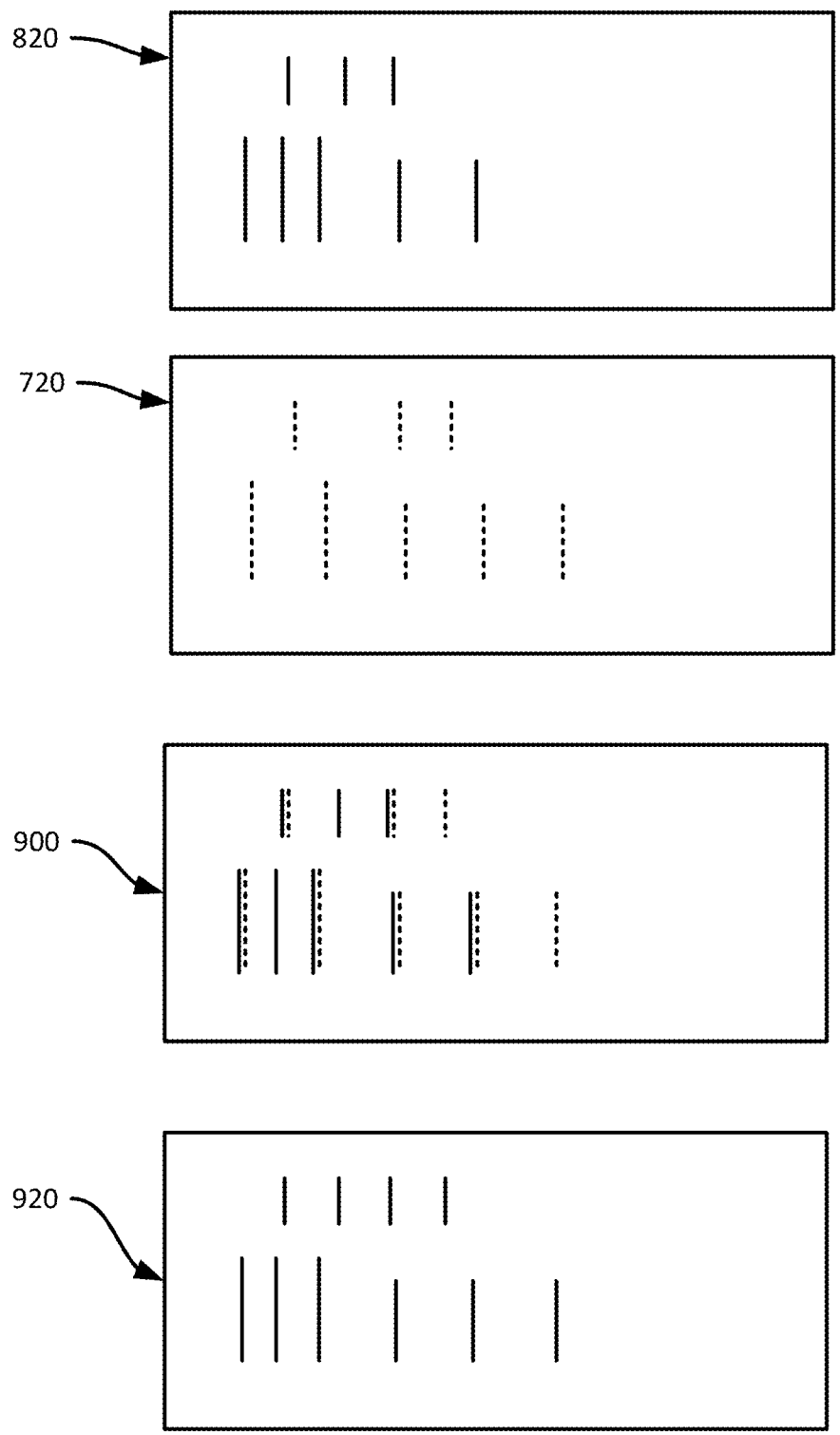
FIG. 9 is a diagram illustrating combination of first and second sets of candidate facing edges at block 435 of the method of FIG. 4.

Turning to FIG. 9, the final first and second sets 720 and 820 of candidate facing edges are shown (with the set 720 shown in dashed lines to distinguish from the edges of the set 820), along with a combined set 900 including all the edges from both sets 720 and 820. Also illustrated in FIG. 9 is a combined, clustered set 920 following the clustering of edges as discussed above.

Returning to FIG. 4, at block 440 the server 101 generates candidate facing boundaries. In the present embodiment the candidate facing boundaries are bounding boxes, generated by extending horizontal segments between the upper and lower ends of each adjacent pair of candidate facing edges. That is, the adjacent pair of candidate edges form the sides of a candidate boundary, while the above-mentioned horizontal segments form the top and bottom of the candidate boundary.

Figure 10:
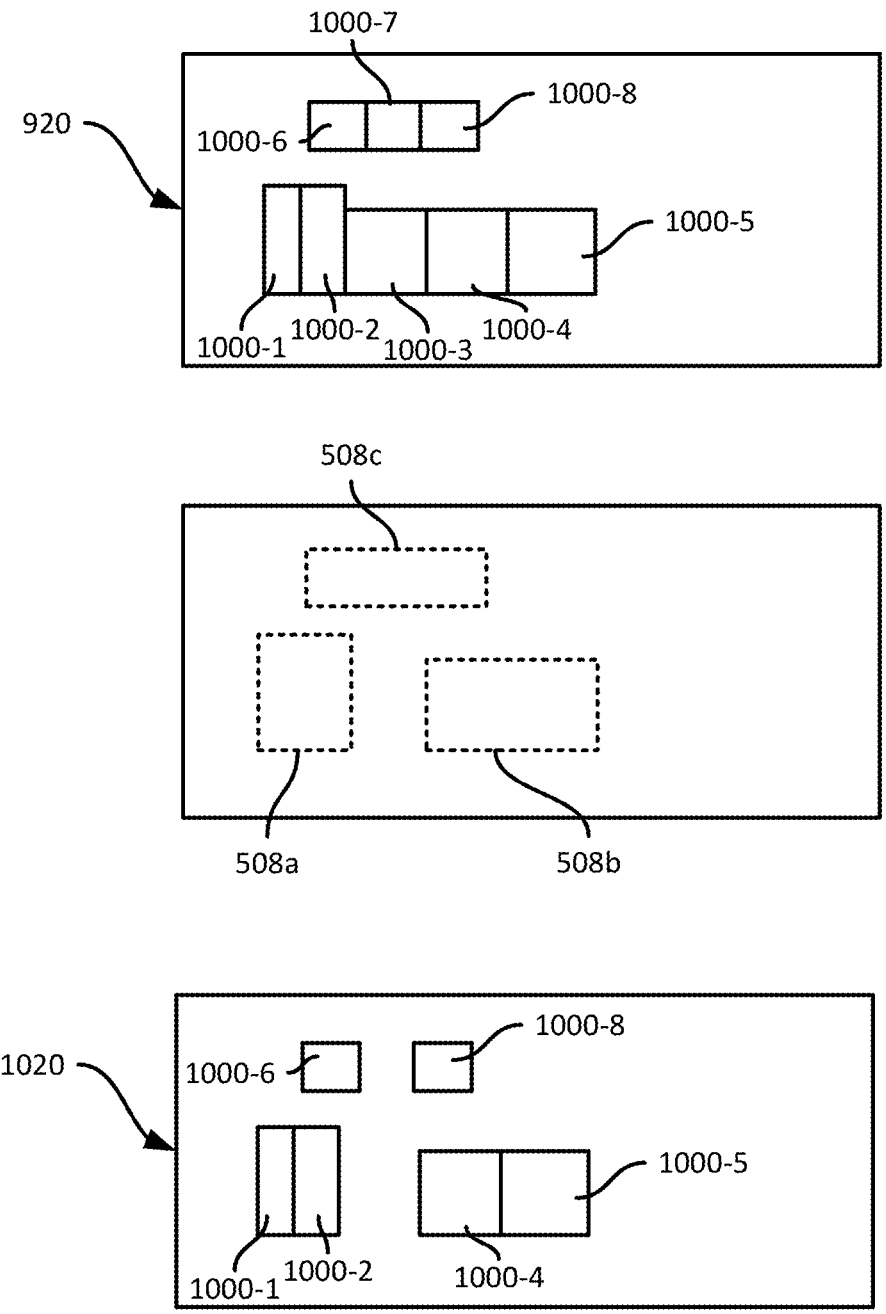
FIG. 10 is a diagram illustrating generation and validation of candidate facing boundaries at blocks 440 to 460 of the method of FIG. 4.

Turning to FIG. 10, the combined, clustered set 920 of candidate edges is shown along with the above-mentioned horizontal segments. The server 101 has, in other words, generated eight candidate facing boundaries 1000-1, 1000-2, 1000-3, 1000-4, 1000-5, 1000-6, 1000-7, and 1000-8. As will be apparent from a comparison of FIG. 10 to FIG. 5, however, certain candidate facing boundaries do not in fact correspond to actual products 112. To remove such false positives, at block 445 the server 101 determines whether each candidate facing boundary 1000 is within an ROI indicator 508. The candidate facing boundary 1000 need not be entirely within an ROI indicator. For example, the server 101 can apply an overlap threshold at block 445, such that the determination at block 445 is affirmative when at least 90% of the candidate facing boundary 1000 is within an ROI indicator 508. A wide variety of other thresholds may also be employed at block 445.

When the determination at block 445 is negative, the candidate facing boundary 1000 is discarded at block 450. When the determination at block 445 is affirmative, however, indicating that the candidate facing boundary 1000 is valid (i.e. represents an actual product 112), the candidate facing boundary 1000 is kept at block 455. At block 460, the server 101 completes the detection of product facings by outputting the validated candidate facing boundaries 1000 (i.e. those for which the determination at block 445 was affirmative). The server 101 can perform block 460, for example, by storing the validated candidate facing boundaries 1000 persistently in the repository 132. Each candidate facing boundary 1000 is stored as a bounding box defined in the frame of reference 102. FIG. 10 shows a final set 1020 of output facing boundaries, excluding the boundaries 1000-3 and 1000-7, which do not fall within any of the ROI indicators 508.

At block 460, the boundary generator 130 can also provide the validated candidate facing boundaries 1000 to other downstream processes, whether executed by the server 101 or by another computing device. Examples of such downstream processes include gap detectors (to detect gaps between facings indicative of out-of-stock products) and the like. The boundary generator 130 can also control a display connected to the server 101 to present the output set of facing boundaries. In other words, the boundary generator 130 completes the detection of product facings by presenting product facing detection output that includes the validated candidate facing boundaries 1000.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method by an imaging controller of detecting product facings from captured depth and image data, the method comprising:

obtaining at the imaging controller: (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a respective subset of the plurality of product facings on the support structure;

generating, by a depth detector of the imaging controller, from the depth measurements of the at least one depth sensor, a first set of candidate facing edges;

generating, by an image detector of the imaging controller, from the image data of the at least one image sensor, a second set of candidate facing edges from the image data;

generating by a boundary generator of the imaging controller:

(i) a third set of candidate facing edges by combining the first and second sets, and (ii) a candidate facing boundary for each adjacent pair of candidate facing edges in the third set of candidate facing edges;

verifying, by the imaging controller, that the candidate facing boundaries correspond to positions of products on the support structure by selecting, by the boundary generator of the imaging controller, a subset of output facing boundaries from the candidate facing boundaries that are disposed within the ROI indicators;

detecting, by the boundary generator of the imaging controller, product facings including the selected subset of output facing boundaries.

2. The method of claim 1, wherein generating the first set of candidate facing edges includes:

generating a two-dimensional depth map from the depth measurements; and detecting edges in the depth map.

3. The method of claim 2, wherein detecting edges in the depth map includes:

applying an edge detection operation to the depth map to generate an edge-weighted depth map; and applying a line detection operation to the edge-weighted depth map.

4. The method of claim 3, further comprising discarding candidate edges of the first set that are not within an ROI indicator.

5. The method of claim 1, wherein generating the second set of candidate facing edges includes:

selecting a plurality of windows from the image data; and classifying each window as one of containing an edge and not containing an edge.

6. The method of claim 5, further comprising:

determining a position of each candidate facing edge of the second set based on an intensity profile of a corresponding one of the windows.

7. The method of claim 1, wherein combining the first and second sets of candidate facing edges includes:

for each pair of adjacent candidate facing edges, determining whether a distance separating the pair is below a threshold;

when the distance separating the pair is below the threshold, replacing the pair with a single candidate facing edge.

8. The method of claim 1, wherein generating the candidate facing boundaries includes:

joining upper ends of the adjacent pair of the third set of candidate facing edges with an upper boundary segment; and joining lower ends of the adjacent pair of the third set of candidate facing edges with a lower boundary segment.

9. The method of claim 1, wherein selecting the subset of output facing boundaries includes discarding candidate facing boundaries outside the ROI indicators.

10. A computing device, comprising:

a memory storing: (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a respective subset of the plurality of product facings on the support structure;

an imaging controller having:

a depth detector configured to:

obtain the depth measurements and the ROI indicators; and generate, from the depth measurements of the at least one depth sensor, a first set of candidate facing edges;

an image detector configured to:

obtain the image data and the ROI indicators; and generate, from the image data of the at least one image sensor, a second set of candidate facing edges; and a boundary generator configured to generate:

a third set of candidate facing edges by combining the first and second sets;

a candidate facing boundary for each adjacent pair of candidate facing edges in the third set of candidate facing edges;

verify that the candidate facing boundaries correspond to positions of products on the support structure by selecting a subset of output facing boundaries from the candidate facing boundaries that are disposed within the ROI indicators; and detect product facings including the selected subset of output facing boundaries.

11. The computing device of claim 10, wherein the depth detector is configured, in order to generate the first set of candidate facing edges, to:
  generate a two-dimensional depth map from the depth measurements; and
  detect edges in the depth map.

12. The computing device of claim 11, wherein the depth detector is configured, in order to detect edges in the depth map, to:
  apply an edge detection operation to the depth map to generate an edge-weighted depth map; and
  apply a line detection operation to the edge-weighted depth map.

13. The computing device of claim 12, wherein the depth detector is further configured to discard candidate edges of the first set that are not within an ROI indicator.

14. The computing device of claim 10, wherein the image detector is configured, in order to generate the second set of candidate facing edges, to:
  select a plurality of windows from the image data; and
  classify each window as one of containing an edge and not containing an edge.

15. The computing device of claim 14, wherein the image detector is further configured to determine a position of each candidate facing edge of the second set based on an intensity profile of a corresponding one of the windows.

16. The computing device of claim 10, wherein the boundary generator is configured, in order to combine the first and second sets of candidate facing edges, to:
  for each pair of adjacent candidate facing edges, determine whether a distance separating the pair is below a threshold;
  when the distance separating the pair is below the threshold, replace the pair with a single candidate facing edge.

17. The computing device of claim 10, wherein the boundary generator is configured, in order to generate the candidate facing boundaries, to:
  join upper ends of the adjacent pair of the third set of candidate facing edges with an upper boundary segment; and
  join lower ends of the adjacent pair of the third set of candidate facing edges with a lower boundary segment.

18. The computing device of claim 10, wherein the boundary generator is configured, in order to select the subset of output facing boundaries, to discard candidate facing boundaries outside the ROI indicators.

19. A non-transitory computer-readable medium storing instructions executable by an imaging controller to configure the imaging controller to:
  obtain (i) depth measurements from at least one depth sensor, the depth measurements representing a support structure supporting a plurality of product facings, (ii) image data from at least one image sensor, the image data representing the support structure, and (iii) a set of region of interest (ROI) indicators, each ROI indicator indicating a position of a respective subset of the plurality of product facings on the support structure;
  generate, at a depth detector of the imaging controller, from the depth measurements of the at least one depth sensor, a first set of candidate facing edges;
  generate, at an image detector of the imaging controller, from the image data of the at least one image sensor, a second set of candidate facing edges;
  generate, at a boundary generator of the imaging controller, a third set of candidate facing edges by combining the first and second sets;
  generate, at the boundary generator of the imaging controller, for each adjacent pair of candidate facing edges in the third set of candidate facing edges, a candidate facing boundary;
  verify that the candidate facing boundaries correspond to positions of products on the support structure by selecting, at the boundary generator of the imaging controller, a subset of output facing boundaries from the candidate facing boundaries that are disposed within the ROI indicators; and
  detect, by the boundary generator of the imaging controller, product facings including the selected subset of output facing boundaries.

* * * * *